Dec. 9, 1930.    E. TEUTSCH    1,784,644
WOODWORKING MACHINE
Filed Sept. 24, 1927    3 Sheets-Sheet 1
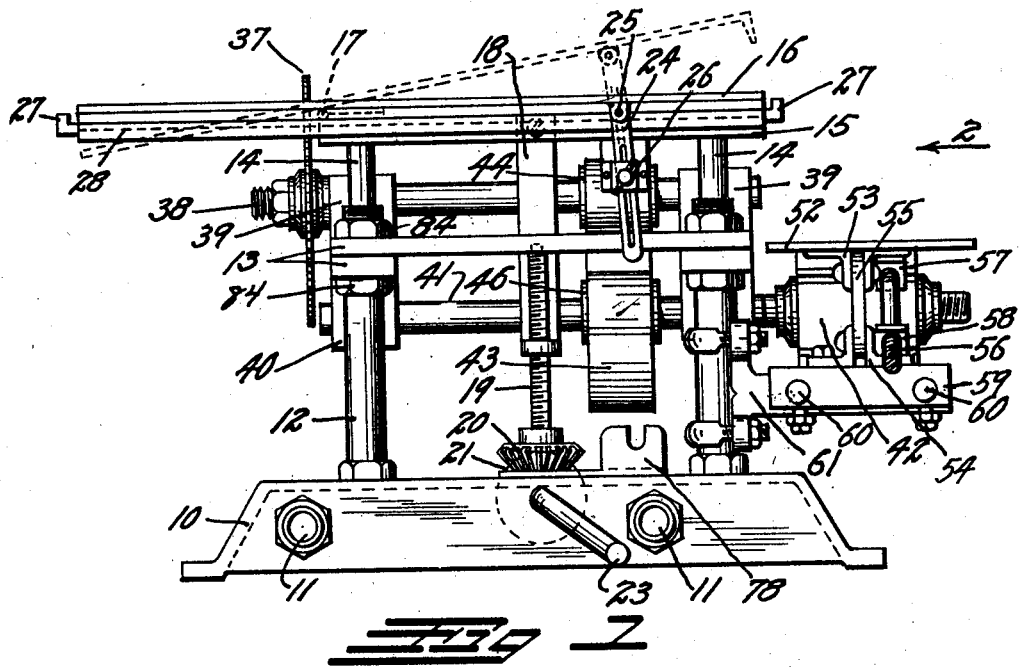
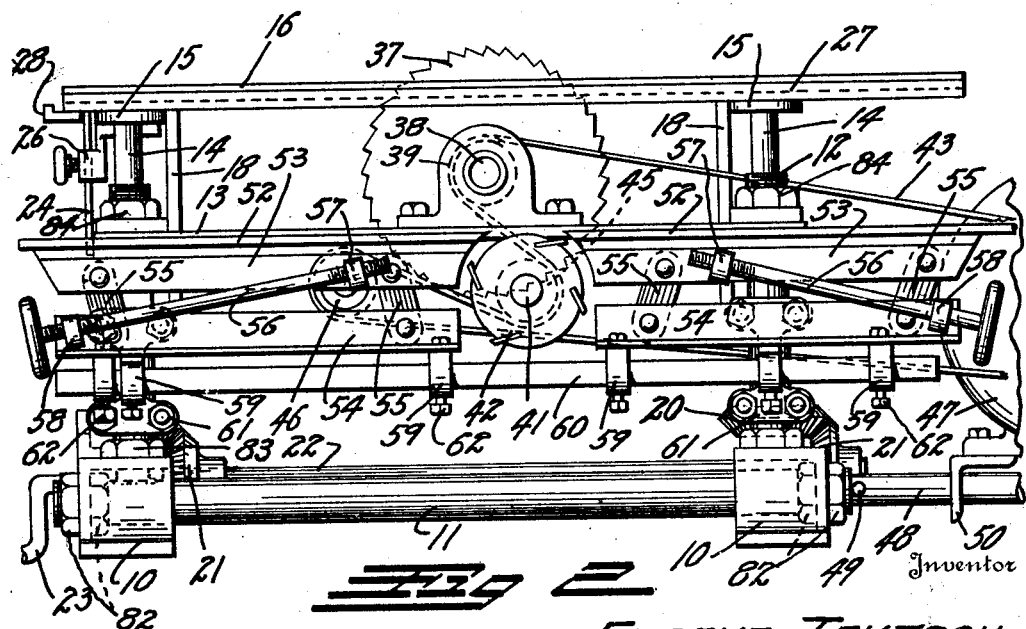
Inventor
EUGENE TEUTSCH
By
Attorney Dec. 9, 1930.   E. TEUTSCH   1,784,644
WOODWORKING MACHINE
Filed Sept. 24, 1927   3 Sheets-Sheet 2
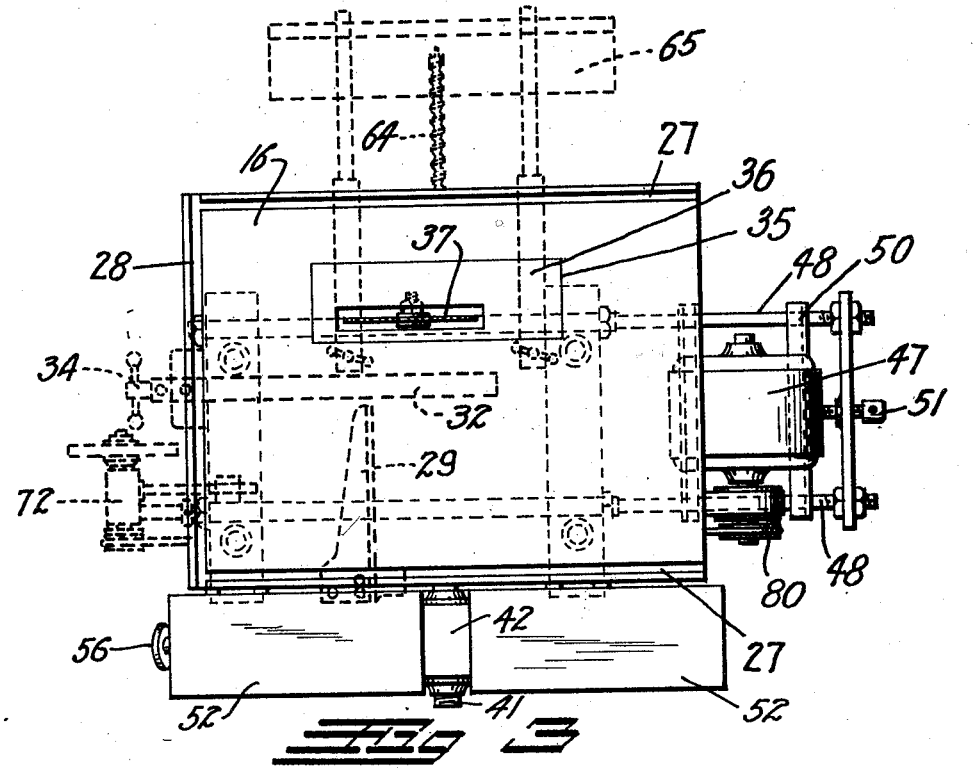
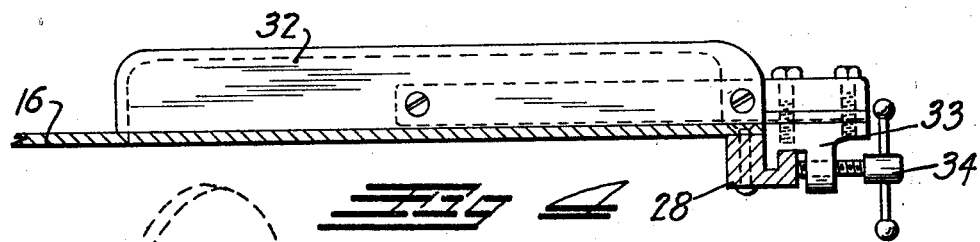
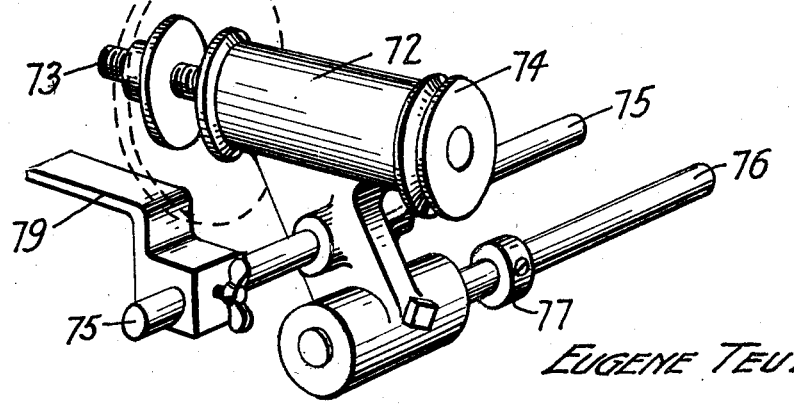
Inventor
EUGENE TEUTSCH

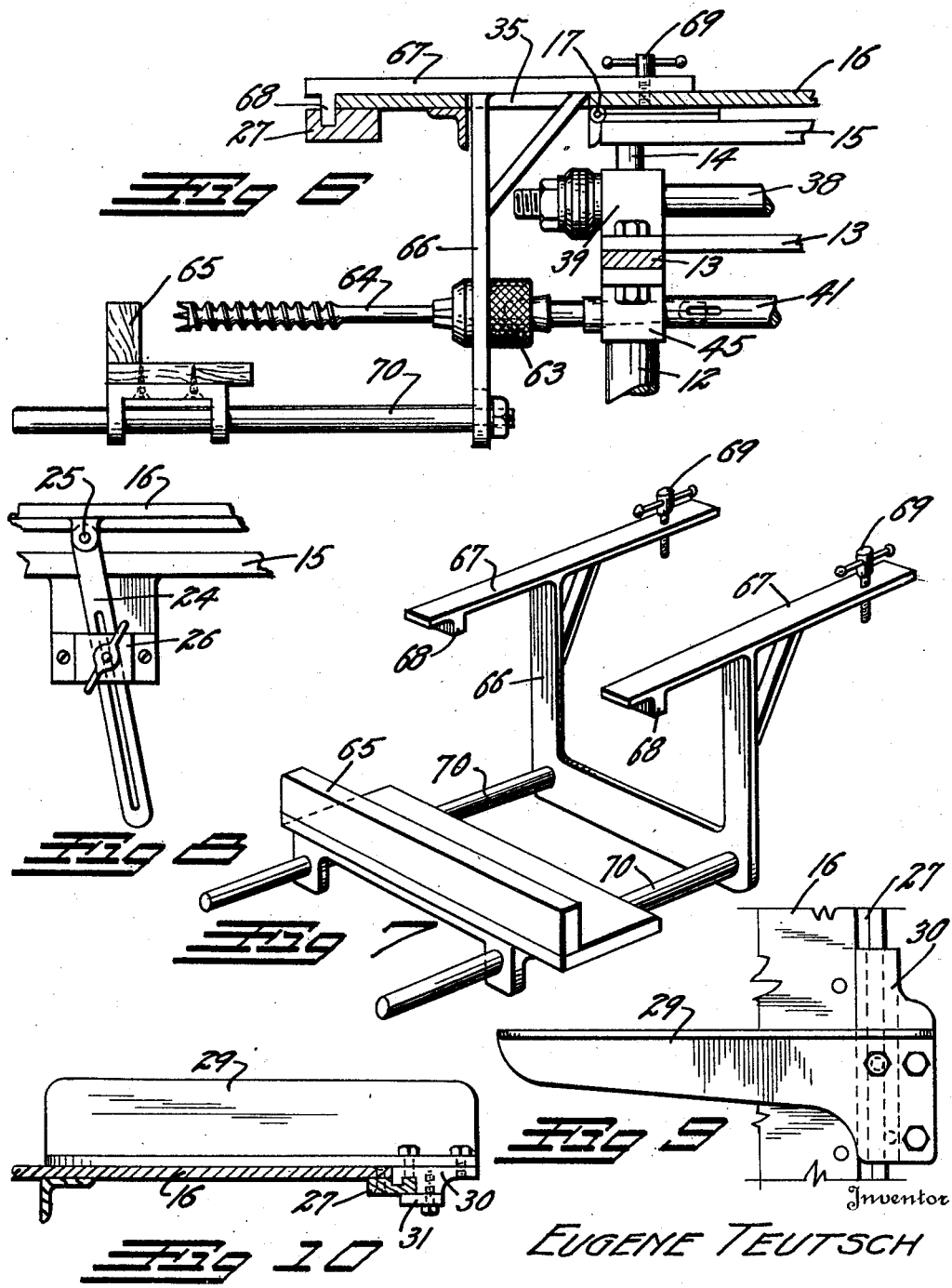

Patented Dec. 9, 1930

1,784,644

UNITED STATES PATENT OFFICE

EUGENE TEUTSCH, OF DENVER, COLORADO

WOODWORKING MACHINE

Application filed September 24, 1927. Serial No. 221,676.

This invention relates to a woodworking machine and has for its principal object, the provision of a simple, compact, efficient machine which can be used for sawing, planing, jointing, rabbeting, dadoing, boring and grinding.

Another object of the invention is to provide a vertically adjustable saw table which will maintain its plane at any height of adjustment.

Another object is to provide a jointer table which can be readily adjusted for depth of cut without interfering with its horizontal position.

Still another object is to provide an attachment for boring, drilling and routing which may be quickly and easily attached to a saw table.

A further object is to provide a grinding attachment which may be quickly and easily attached to a saw or jointer.

A further object resides in the construction of the table top which allows a sheet metal top to be used in place of the usual cast top.

A still further object of the invention is to provide a jointer table in which the table at each side of the knives can be quickly and easily horizontally adjusted.

Other objects and advantages reside in the detail construction of the invention, which is designed for economy, efficiency and simplicity. These will become more apparent from the following description.

In the following detailed description of the invention, reference is had to the accompanying drawings which form a part hereof. Like numerals refer to like parts in all views of the drawing and throughout the description.

In the drawings:

Fig. 1 is an end elevation of my improved woodworking machine, with the jointer attachment in place.

Fig. 2 is a side elevation thereof, looking in the direction of arrow 2, Fig. 1.

Fig. 3 is a plan view of the device with the jointer attached. In this view, in broken line, the positions of the grinding and boring attachments, sawing guides, etc., are indicated.

Fig. 4 is a detail view of the ripping guide.

Fig. 5 is a detail perspective view of the grinding attachment.

Fig. 6 is a detail cross section through the edge of the saw table, illustrating the boring attachment in place thereon.

Fig. 7 is a perspective view of the boring table.

Fig. 8 is a detail view illustrating the bracket for supporting the saw table at an angle.

Fig. 9 is a plan view of the cross cutting guide.

Fig. 10 is a side elevation thereof.

The invention comprises a base frame composed of two angle base members 10, connected by means of horizontal base tubes 11 and supporting vertical tubular standards 12. The standards 12 carry top frame members 13, which act to tie the upper extremities of the four standards together. Vertically slidable in the standards 12 are table legs 14 which support a horizontal table frame 15. The saw table is illustrated at 16, hinged to one side of the table frame, as shown at 17. The table frame is raised or lowered by means of brackets 18 which engage vertically placed, threaded, adjusting screws 19, carrying bevel pinions 20 at each extremity of the table. The pinions 20 are rotated from similar pinions 21 carried on a crank shaft 22 that terminates at one extremity of the machine in a table adjusting crank 23. Instead of the bevel pinions 20 and 21, of course, worms and worm wheels, or spiral gears and the like, might be used.

It can be readily seen that rotation of the table adjusting crank 23 will rotate the screws 19 and raise or lower the table evenly throughout its length. The table is caused to rise without changing its plane by having the table legs 14 closely fitted into the standards 12 and firmly secured to the table frame 15. By this construction, the table frame must at all times remain horizontal since the table legs cannot change their positions in the standards.

The angle of the table with reference to the horizontal, can be changed as desired, a sliding clamp structure being employed to maintain the desired angle. This clamp structure is illustrated in detail in Fig. 8, and comprises a slotted bar 24, pivoted to the table top at 25 and adapted to be clamped in any desired vertical position by means of a screw clamp 26. The screw clamp 26 is carried on the table frame 15 so that the raising or lowering of the table frame does not interfere with the angle of the saw table.

I prefer to form the table from boiler plate or similar sheet metal, and place along each of its two longitudinal edges, a grooved guide bar 27, and along its one end, a grooved guide bar 28. A cross cut guide 29, illustrated in detail in Figs. 9 and 10, is arranged to slide in the guide bars 27. The cross cut guide 29 is provided with a tongue and groove guide fitting 30 and a holding plate 31 which maintains it constantly in slidable engagement with the guide bar 27.

The cross cut guide 29 can be slid from the guide bar 27 at either end of the table for the end guide bar 28 is placed at a lower level, as shown in Fig. 4, to allow the cross cut guide 29 to pass thereover. The guide bar 28 is used for maintaining a ripping guide 32 in place. The ripping guide is shown in detail, Fig. 4, and is carried on a clamp 33 having a clamp screw 34 which firmly locks the guide at any desired position along the guide bar 28.

As is usual in saw table tops, a relatively large opening 35 is left in which a wooden saw block 36 is placed to surround the saw and prevent its contacting with metal. The saw is illustrated at 37 on a saw mandrel 38 supported in bearings 39 on the upper side of the top frame members 13. Supported in bearings 40, on the lower side of the top frame members 13, is a jointer mandrel 41 adapted to carry any of the usual jointer knife heads 42. The saw and jointer mandrels are driven by means of a belt 43 which passes first around a pulley 44 on the saw mandrel, thence around a pulley 45 on the jointer mandrel and over an idler pulley 46 to the pulley of a motor 47.

The motor 47 is carried on a frame comprising two supporting bars 48 adapted to fit into the open extremities of the base tubes 11, there being suitable stops 49 provided to cause the bars 48 to project a desired distance. Slidably mounted on the bars 48 are motor base angles 50 which support the motor and which may be moved along the bars 48 by means of a screw 51 for adjusting the tension in the belt 43.

The jointer mandrel 41 projects to one side of the machine so that the jointer knife head is positioned at the side of and below the plane of the saw table. At each side of the jointer mandrel, a jointer table section 52 is arranged. Each table section 52 is carried on angles 53 which are supported from similar angles 54 upon pivoted links 55. An adjusting screw 56 is threaded into a nut 57 on the upper angles 53 and a similar nut 58 on the lower angles 54. By rotating this screw, the table section are drawn forwardly or backwardly so as to swing on the links 55 and adjust the table height. The lower angles 54 are carried on cross bars 59 which may be clamped in any desired position by means of set screws 62 on a pair of parallel table supporting bars 60 which are carried from the standards 12 in brackets 61.

It is desired to call attention to the fact that a very minute adjustment of the height of the table sections 52 can be obtained by the adjusting screw 56 and a very close adjustment as to distance from the jointer knives can be obtained by moving the cross bars 59 along the parallel table supporting rods.

The other extremity of the jointer mandrel 41 is hollowed to receive a bit chuck 63, in which any of the usual types of bits 64 can be carried. To support the work in front of the bit 64, I provide a sliding work holder 65. The work holder is supported from a yoke 66 which extends upwardly through the opening 35 in the saw table, as shown in Fig. 6. Each arm of the yoke 66 is T-shaped and is provided with a cross piece 67 that lies on the saw table and is provided at one extremity with a tongue 68 adapted to extend into the groove of the guide bar 27. The other extremity of each of the cross pieces may be secured to the table top by means of hand screws 69. The yoke 66 extends downwardly under the table and under the bit chuck 63 and carries two relatively long, parallel studs 70 upon which the work holder 65 slides. To place the yoke in position, it is necessary to remove the saw 71 and the wooden saw block 36 from around it.

It is desired to call attention to the fact that a separate adjustment is not necessary for gauging the bit. This can be done by operating the table adjusting crank 23, since the work table is carried by the table top, and will move with it.

A grinding mechanism, illustrated in Fig. 5, is also designed to be attached to the device. This grinding mechanism comprises a bearing casting 72 in which a grinding wheel mandrel 73 is journaled provided with a pulley 74. The bearing casting 72 is supported on an upper and lower stud 75 and 76, respectively. The stud 76 is arranged to slide into the open extremity of one of the base tubes 11, there being a stop 77 arranged to allow the stud to project from the tube a predetermined distance. The upper stud 75 lies in a notched yoke 78, see Fig. 1, secured to the upper surface of one of the angle base members 10. The other extremity of the stud 75 projects beyond the bearing casting 72 and supports an adjustable tool rest 79. The position of the grinding attachment when in place, is illustrated in broken line in Fig. 3.

To drive the grinder, a small, round, belt 81 is trained from the pulley 74 to a second pulley 80 on the extremity of the shaft of the motor 47.

By the method of construction employed in the machine all welding, bolts, rivets, castings, etc., are eliminated in the frame of the machine. The base members 10 are rigidly maintained at their proper separation by being clamped between lock nuts 82 threaded on the extremities of the base tubes 11. The standards 12 are maintained rigidly vertical on the base members by similar lock nuts 83 which are threaded on the standard tubes 12. The top frame members 13 are also clamped between lock nuts 84 on the standards.

While a specific form of the improvement has been described and illustrated herein, it is desired to be understood that the same may be varied, within the scope of the appended claims, without departing from the spirit of the invention.

Having thus described the invention, what I claim and desire to secure by Letters Patent is:—

1. Frame construction for saw tables comprising base members; standards arising from said base members and adapted to support a table top; parallel, horizontal base tubes connecting said base members; bars extending into the extremities of said hollow base tubes; cross members slidably mounted on said bars and arranged to carry a motor; and means for moving said cross members along said bars and maintaining them in any desired position thereon.

2. The combination with a saw table having an opening for said saw and a rotating shaft therebelow, of a yoke adapted to extend through said opening and extend below said table; cross pieces on said yoke adapted to rest and be secured to the top of said table; studs projecting from said yoke to one side of said table; and a work holder slidably mounted on said studs, there being a socket formed in said rotating shaft for supporting a boring tool adjacent said work holder.

3. Table construction for saw and jointer tables comprising a supporting frame: a table top; a base member; links pivotally connected at their extremities between said table top and said base member; adjusting means arranged to swing said links in a vertical arc to vary the height of said top, said latter means being carried by said top and said base member so that horizontal movement of the latter will not affect the vertical height of said top and means for horizontally adjusting said base member upon said supporting frame.

4. Table construction for saw and jointer tables comprising: a pair of fixedly-supported horizontal parallel bars; a base member arranged for movement along said bars; means for locking said base member in any desired position thereon; a table top; pivoted links extending between said base member and said table top and adapted to support the latter; and adjusting means carried by said top and said base member so as to rotate said links about their pivots and vary the height of said table.

5. Table construction for saw and jointer tables comprising: a pair of fixedly-supported horizontal parallel bars; a base member arranged for movement along said bars; means for locking said base member in any desired position thereon; a table top; pivoted links extending between said base member and said table top and adapted to support the latter; and adjusting means carried by said base member so as to rotate said links about their pivots and vary the height of said table, said means comprising an adjusting screw extending between said base member and said top.

6. Means for supporting a saw or jointer table top so that its elevation can be changed to various parallel planes, comprising: a support; a series of links pivoted to said top and to said support, all of said links arranged to swing in the same vertical plane; and means for swinging said links so as to change the elevation of said table; and means for allowing horizontal movement of said support without affecting the height of said table.

7. Means for supporting a saw or jointer table top so that its elevation can be changed to various parallel planes, comprising: a support; a series of links pivoted to said top and to said support, all of said links arranged to swing in the same vertical plane; means for swinging said links so as to change the elevation of said table, said means comprising a nut fixed adjacent one extremity of said links; a second nut adjacent the other extremity; and a threaded rod connecting said nuts and arranged so that rotation of said rod will swing said links about their pivots, both of said nuts being carried on the members supporting the pivots of said links so that horizontal movement of said support will not affect the vertical height of said top.

8. Table construction for saw and jointer tables comprising a table top; a base member for said top; links pivotally connected to said base member at their one extremities and similarly connected to said table top at their other extremities; means carried by said base member for rotating said links in a vertical arc so as to change the vertical height of said table; a fixed support; parallel horizontal bars supported by said fixed support, said supporting members arranged to slide along said parallel bars; and means for maintaining said supporting members in any desired position on said parallel bars.

In testimony whereof, I affix my signature.

EUGENE TEUTSCH.